April 19, 1938.  I. CHABON  2,114,795

BUCKLE MAGAZINE CHARGING STICK

Filed Nov. 13, 1936

INVENTOR.
IRVING CHABON
BY
Clark & Ott
ATTORNEYS

Patented Apr. 19, 1938

2,114,795

UNITED STATES PATENT OFFICE 2,114,795

BUCKLE MAGAZINE CHARGING STICK

Irving Chabon, Brooklyn, N. Y.

Application November 13, 1936, Serial No. 110,671

1 Claim. (Cl. 223—49)

This invention relates to a device for holding a quantity of buckles, loops or slides for the shoulder straps of brassières, corsets, slips or the like and the same comprehends an improved device of this nature for facilitating the operation of charging the magazine of a machine employed for assembling the buckles, loops or slides with the shoulder straps.

The invention more particularly resides in the provision of an elongated charging stick preferably constructed of an inexpensive light weight material such as thin metal stock or paper or fiberboard, and which stick is formed at one end with an enlarged head, at the opposite end with a pointed terminal, and includes a removable retaining element anchored to the stick adjacent the pointed terminal for confining the charge of buckles, loops or slides between said element and the enlarged head.

With the foregoing and other objects in view, reference is now made to the following specification and the accompanying drawing in which there is disclosed a preferred form of the invention, while the appended claim covers variations and modifications which fall within the scope of the invention.

Figure 1:
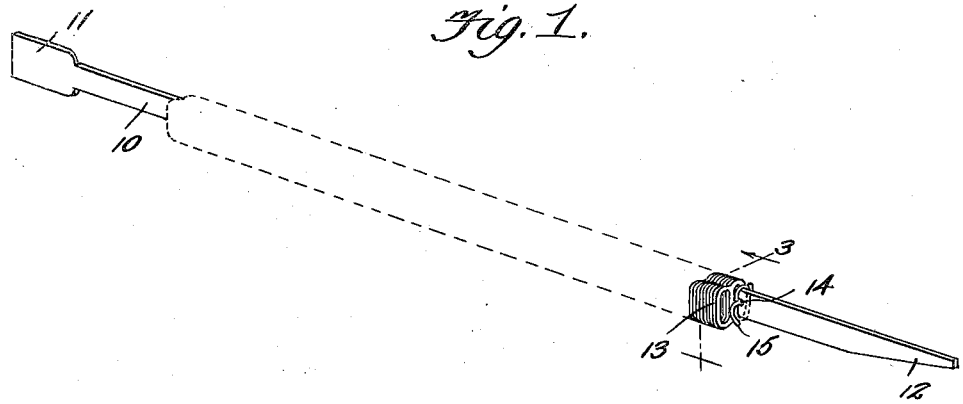
Fig. 1 is a perspective view of a charging stick constructed in accordance with the invention and illustrating a quantity of slides arranged thereon.
Figure 2:
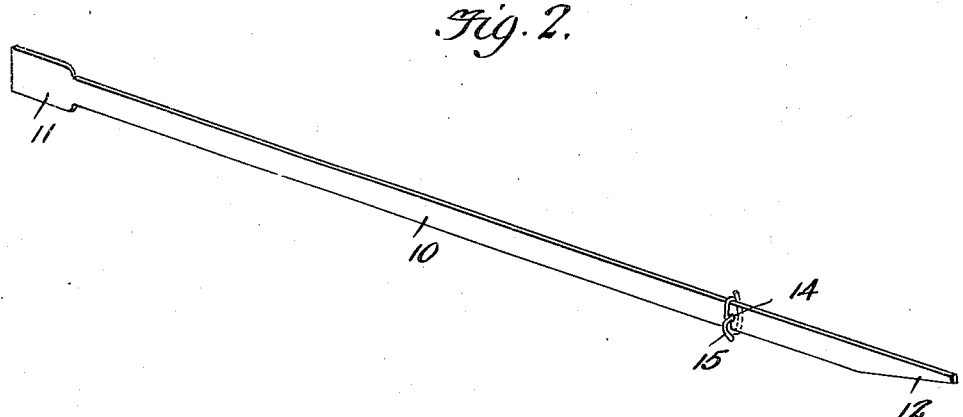
Fig. 2 is a similar view illustrating the stick with the slides removed.
Figure 3:
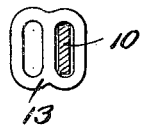
Fig. 3 is an enlarged transverse sectional view taken approximately on the line 3—3 of Fig. 1.
Figure 4:
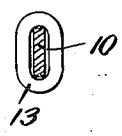
Fig. 4 is a similar view illustrating the stick with a loop supply thereon.

Referring to the drawing by characters of reference, 10 designates an elongated strip of material, such as thin metal stock, compressed paper or fiber board, or any equivalent inexpensive material which is stamped from the stock to provide an enlarged head 11 at one end thereof and a pointed terminal 12 at the opposite end. The slides 13 or other equivalent articles are threaded onto the stick by inserting the pointed end through the openings thereof, the cross sectional size of the stick being such as to dispose the slides or other equivalent articles in longitudinal alignment so that the same, when fed from the stick into the magazine to charge the same, are disposed in proper alignment in the magazine, it being understood that the stick is withdrawn and discarded.

In order to retain the slides or equivalent articles 13 on the stick, suitable means is provided which is anchored to the stick adjacent the pointed terminal 12, between which means and the enlarged head 11, the slides or articles are confined. As particularly illustrated in the present instance, the stick is formed with a perforation 14 adjacent the pointed terminal 12 through which a wire 15 is inserted and bent to a position to retain itself in place and provide a stop with which the endmost slide or article engages. It is, of course, obvious that when the slides or articles are to be introduced into the magazine of the machine, the wire or retaining element 15 is removed.

What is claimed is:

A magazine charging stick for lingerie shoulder strap buckles, loops, slides or similar articles, having openings of like size comprising an elongated member fashioned from a length of sheet material providing a flat flexible shank of a cross sectional size to snugly fit the openings of said articles, and including a head at one end thereof having oppositely projecting lateral extensions in the plane of the shank, one edge of the shank being cut obliquely to provide a pointed terminal at the opposite end, and provided with an aperture adjacent the pointed terminal, and a deformable means removably extending through said aperture and bent to a position to retain itself in place and to provide a stop for confining the articles between the same and the head.

IRVING CHABON.